United States Patent
Baglin

(10) Patent No.: US 7,675,282 B2
(45) Date of Patent: Mar. 9, 2010

(54) DUAL MODE CHIP CARD VOLTAGE REGULATION CIRCUIT AND METHOD

(75) Inventor: Thomas Jean Ludovic Baglin, Graz (AT)

(73) Assignee: Infineon Technologies AG (DE)

(*) Notice: Subject to any disclaimer, the term of this patent is extended or adjusted under 35 U.S.C. 154(b) by 772 days.

(21) Appl. No.: 11/548,088

(22) Filed: Oct. 10, 2006

(65) Prior Publication Data

US 2008/0084193 A1  Apr. 10, 2008

(51) Int. Cl.
 *H02M 3/158* (2006.01)
(52) U.S. Cl. .................... 323/350; 323/269
(58) Field of Classification Search .......... 323/269, 323/349, 350
See application file for complete search history.

(56) References Cited

U.S. PATENT DOCUMENTS

| | | | |
|---|---|---|---|
| 4,456,833 A | 6/1984 | Traub et al. | |
| 5,179,358 A * | 1/1993 | Martin | 331/1 A |
| 2008/0084193 A1 * | 4/2008 | Baglin | 323/265 |

FOREIGN PATENT DOCUMENTS

| | | |
|---|---|---|
| DE | 3144696 | 5/1983 |
| DE | 10311966 | 12/2004 |
| EP | 1128532 | 8/2001 |
| JP | 2005 196251 | 7/2005 |

* cited by examiner

*Primary Examiner*—Jeffrey L Sterrett
(74) *Attorney, Agent, or Firm*—Dickstein, Shapiro, LLP.

(57) ABSTRACT

A circuit arrangement for voltage regulation including a first transistor coupled between a first node and a third node, a second transistor coupled between a second node and the third node, a third transistor coupled between the third node and an output node, and a control unit that can be coupled to the first transistor, that can be coupled to the second transistor, and is coupled to the third transistor, wherein the control unit is configured to steer the transistors such that a predetermined output voltage is provided at the output node when a supply voltage is provided at one of the first node and the second node.

33 Claims, 4 Drawing Sheets

DUAL MODE CHIP CARD VOLTAGE REGULATION CIRCUIT AND METHOD

FIELD OF THE INVENTION

The invention concerns a circuit arrangement and a method for voltage regulation in particular for chip card applications.

BACKGROUND OF THE INVENTION

Typically, a chip card reader supplies power for chip cards including an integrated circuit in order to operate the chip card. The power is supplied via a contact-based interface or a contactless interface.

Often, the chip card comprises chip card contacts, which are connected to the chip card reader. A supply voltage is applied to the chip card contacts. Typically, the voltage that is applied to the chip card contacts is regulated down by a regulating unit to a core voltage, which typically has a fixed value. The regulating unit may comprise a steered transistor to regulate the supply voltage to the core voltage.

So-called contactless chip cards comprise a contactless interface that includes, for example, a coil. The power is supplied by means of an electromagnetic field generated by the chip card reader. The coil receives the electromagnetic field and provides the supply voltage which may vary in dependence of the strength and the modulation of the electromagnetic field. Often, the supply voltage, which is provided by the coil, is regulated to a fixed core voltage.

Dual mode chip cards comprise a contact-based interface and a contactless interface as well. Often, the regulating unit comprises two transistors, one of them is provided to regulate the supply voltage applied to the contact-based interface. The other transistor regulates the voltage provided by the contactless interface. A switch selects the interface and the respective transistor that is used. Switching between the interfaces impacts the regulated core voltage resulting to a core voltage drop.

Large transistors have a high power supply rejection and a high load rejection. Due to this effect smaller transistors result in less area, but also in less power supply rejection and less load rejection of the regulating unit.

For these and other reasons there is a need for the present invention.

SUMMARY OF THE INVENTION

One aspect of the present invention provides a circuit arrangement for voltage regulation. The circuit arrangement includes a first transistor coupled between a first node and a third node, a second transistor coupled between a second node and the third node, a third transistor coupled between the third node and an output node, and a control unit that can be coupled to the first transistor, that can be coupled to the second transistor, and is coupled to the third transistor, wherein the control unit is configured to steer the transistors such that a predetermined output voltage is provided at the output node when a supply voltage is provided at one of the first node and the second node.

BRIEF DESCRIPTION OF THE DRAWINGS

Embodiments of the invention are better understood with reference to the following drawings.

DETAILED DESCRIPTION

In the following detailed description reference is made to the accompanying drawings which form a part thereof and in which is shown, by way of illustration, specific embodiments in which the invention may be practised. It is to be understood that other embodiments may be utilized and structured or logical changes may be made without departing from the scope of the present invention. The following detailed description, therefore, is not to be taken in a limiting sense, and the scope of the present invention is defined by the appended claims.

Figure 1:
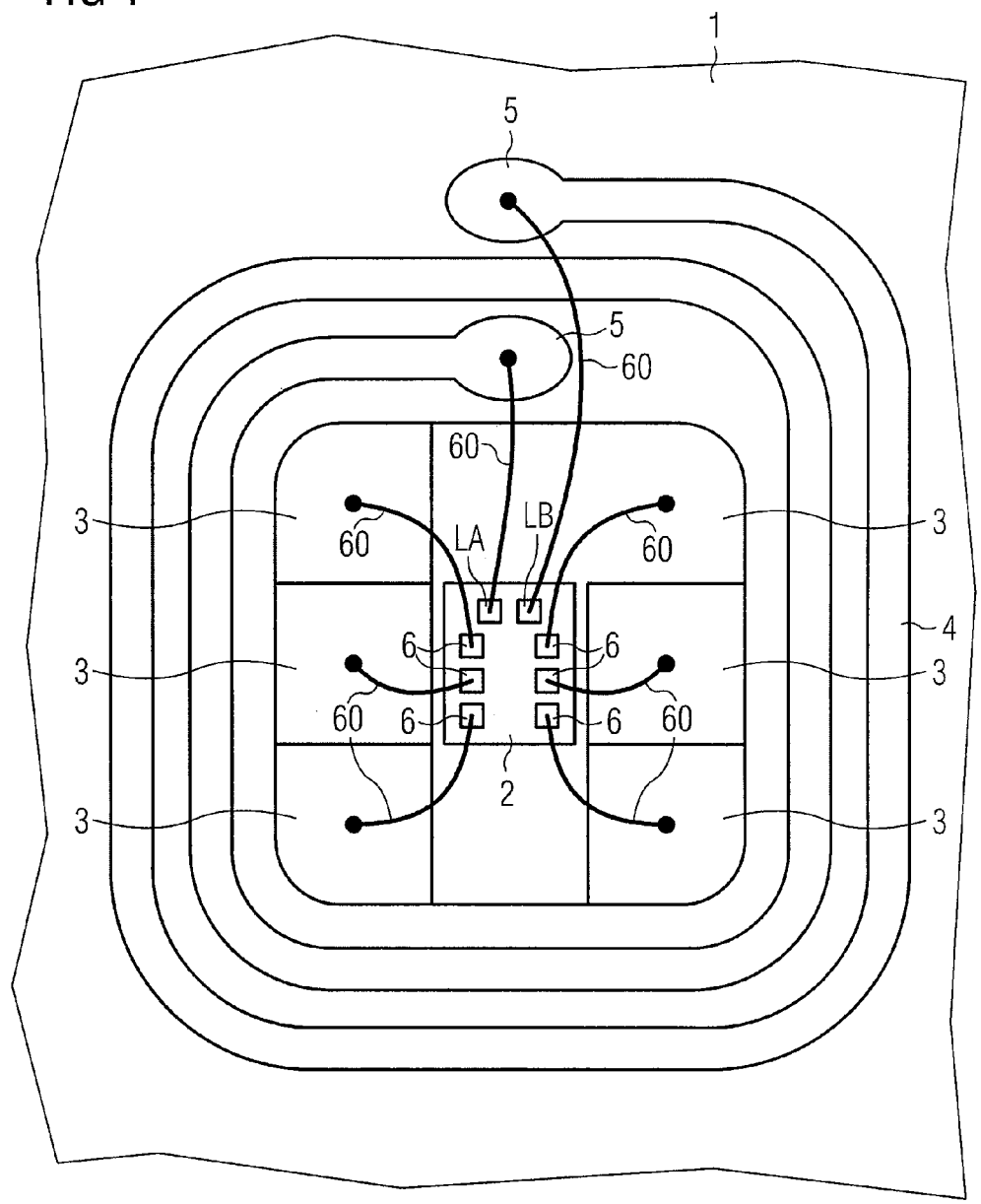
FIG. 1 is a schematic drawing illustrating a section of one embodiment of a chip card.

FIG. 1 shows a section of one embodiment of a chip card having a contact-based interface and a contactless interface.

The chip card comprises a card body 1, a chip 2 including an integrated circuit, chip card contacts 3 and a coil 4 having coil contacts 5. The chip 2 is arranged in a cavity of the card body 1. Chip contacts 6 on the chip 2 are electrically coupled to the chip card contacts 3. The coil contacts 5 are connected to further chip contacts LA, LB on the chip 2.

The embodiment shown in FIG. 1 comprises wire bonds 60 for connecting the chip contacts 6 and the chip card contacts 3. In other embodiments the connection of the chip contacts to the chip card contacts can made by means of a flip-chip technique or any other suitable connection technique.

One embodiment of the contact-based interface comprises five chip card contacts 3 that predefined signals are applied to. According to the ISO standard the contacts referred as VCC, VSS, CLK, RST and IO. A supply potential is applied to the VCC contact while a reference potential is applied to the VSS contact in order to provide a supply voltage. A clock signal is applied the CLK contact. A reset signal is applied to the RST contact. Data is transferred via the IO contact.

The chip card contacts 3 can be connected to a contact-based reader. The supply voltage is applied to the chip card contacts 3 for operating the chip 2 on the chip card.

One embodiment of the contactless interface comprises two further chip contacts LA, LB connected to the coil 4 which is configured to receive and to transmit an electromagnetic field. The electromagnetic field is modulated for the purpose of communication either by a contactless reader or by the chip. One embodiment of the chip card uses an electromagnetic field having a carrier frequency of 13.56 MHz for communication and power supply.

Figure 2:
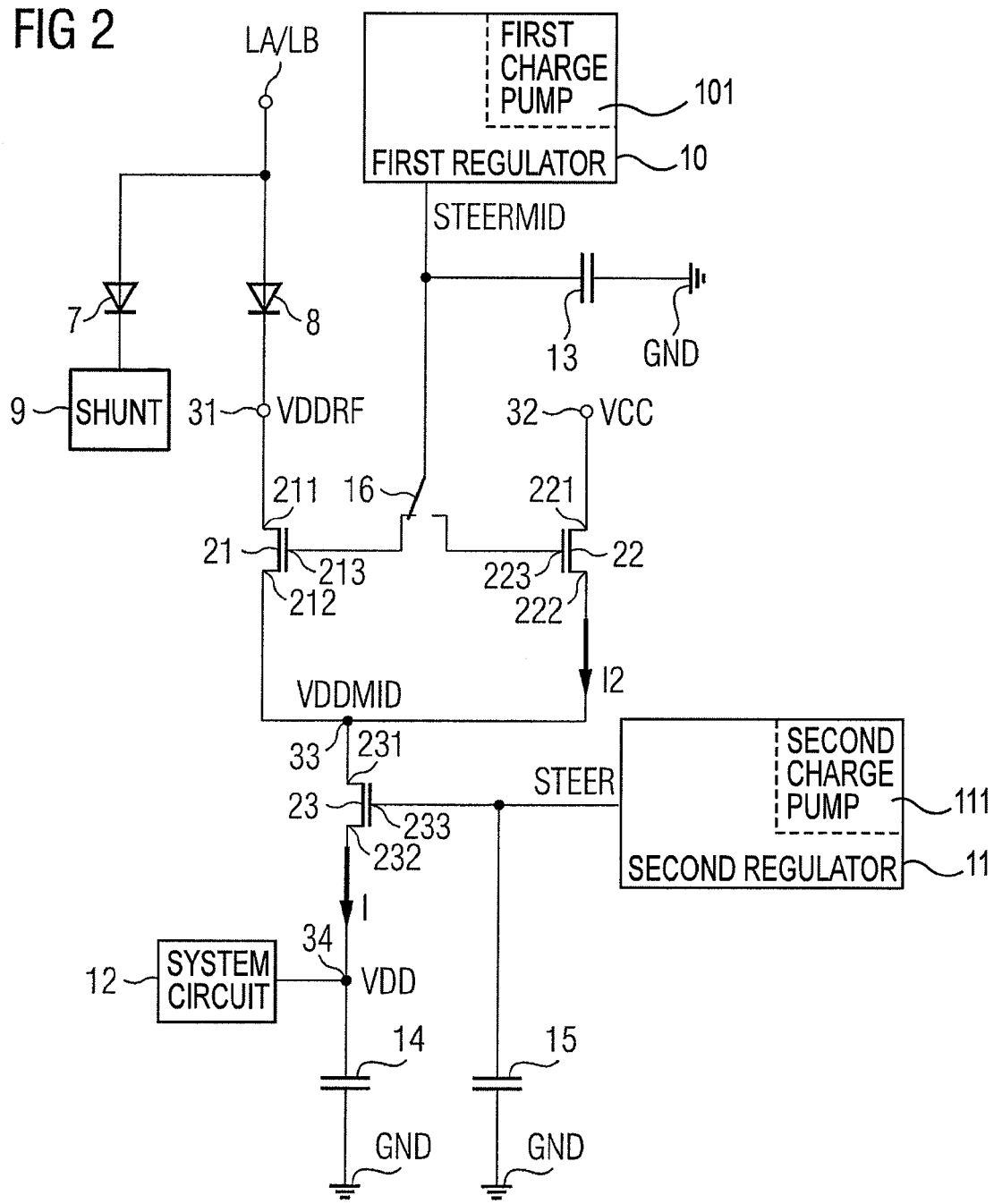
FIG. 2 is a block diagram illustrating one embodiment of a circuit arrangement according to the present invention.

FIG. 2 shows a block diagram illustrating one embodiment of a circuit arrangement according to the present invention, which is part of the integrated circuit on the chip 2. The circuit arrangement regulates a supply voltage in order to provide a core voltage VDD supplying parts of the integrated circuit for operation. In the following the parts of the integrated system that are supplied by the core voltage VDD are called system circuit 12.

The circuit arrangement comprises a coil contact node LA/LB, a first diode 7, a second diode 8 and a shunt 9. The coil contact node LA/LB is electrically connected to one of the chip contacts LA, LA that are designed to be connected with the coil 4. The first diode 7 is connected between the coil contact node LA/LB and the shunt 9. The second diode 8 is connected between the coil contact node LA/LB and a first node 31. The supply voltage VDDRF generated by the contactless interface is provided at the first node 31. The supply voltage VDDRF is related to a reference potential.

A second node 32 provides the supply voltage VCC that is applied to the chip card via the contact-based interface. The second node 32 is electrically connected with the chip contact 6 the supply potential is applied to.

The circuit arrangement further comprises a first transistor 21 and a second transistor 22. Each of the first transistor 21 and the second transistor 22 comprises a first terminal 211, 221, a second terminal 212, 222 and a steering terminal 213, 223. These terminals serve as drain, source and gate, respectively.

The first terminal 211 of the first transistor 21 is connected to the first node 31. The second terminal 212 of the first transistor 21 is connected to a third node 33. The first terminal 221 of the second transistor 22 is connected to the second node 32, and the second terminal 222 of the second transistor 22 is connected to the third node 33.

The circuit arrangement further comprises a first regulator 10 comprising a first charge pump 101 in order to provide a first steering voltage STEERMID that can be adjusted. The first regulator 10 is connected to a switch 16 that is adjusted to apply the first steering voltage STEERMID to the steering terminal 213 of the first transistor 21 or to the steering terminal 223 of the second transistor 22. In one embodiment the other of the steering terminals 213, 223 is connected to the reference potential GND. A first terminal of a first capacitor 13 is coupled between the first regulator 10 and the switch 16. A second terminal of the first capacitor is coupled to the reference potential GND.

A third transistor 23 comprising a first terminal 231, a second terminal 232 and a steering terminal 233 is connected to the third node 33 via its first terminal 231. The second terminal 232 of the third transistor 23 is coupled via a second capacitor 14 to the reference potential GND.

A second regulator 11 comprising a second charge pump 111 is connected to the steering terminal 233 of the third transistor 23. The second regulator 11 is constructed to provide a second steering voltage STEER. A first terminal of a third capacitor 15 is coupled between the second regulator 11 and the steering terminal 233 of the third transistor 23 while a second terminal of the third capacitor 15 is coupled to the reference potential GND.

The first, the second and the third transistor 21, 22, 23 are designed as so called NMOS transistors. Other embodiments comprise other types of transistors, e.g. low-voltage NMOS, high-voltage NMOS and PMOS transistors. In one embodiment the length and width of the transistor are equal. In another embodiment only the length and width of the first and the second transistor are equal, while the length and width of the third transistor differs. A further embodiment includes transistors having different lengths and/or widths.

The system circuit 12 is coupled to an output node 34 between the third transistor 23 and the second capacitor 14. The core voltage VDD is provided at the output node 34. The system circuit 12 is supplied by a current I provided at the second terminal 232 of the third transistor 23.

The circuit arrangement for regulation the supply voltage VDDRF, VCC includes two stages. The first stage comprises the first and second transistor 21, 22, the first regulator 10 and the switch 16. The second stage comprises the third transistor 23 and the second regulator 11. The first stage shifts the supply voltage VDDRF, VCC to an intermediate voltage VDDMID that is provided at the third node 33. In the second stage the intermediate voltage VDDMID is regulated to the core voltage VDD.

The operation of the first, the second, and the third transistor 21, 22, 23 depends on the voltages applied to their terminals. In the following the operation of the second transistor 22 is described for instance. The first and third transistors 21, 23 are adapted to be operated in a same way by applying the respective voltages to their terminals.

The second transistor 22 has a current path between the first terminal 221 and the second terminal 222 that is substantionally conductive if the voltage between the steering terminal 223 and the second terminal 222 is larger than a threshold voltage VTH of the second transistor 22. Thus, the first steering voltage STEERMID increases the intermediate voltage VDDMID by at least VTH if the current path is substantionally conductive.

The first steering voltage STEERMID does not change, for example being equal to VDDMID+VTH, if a constant current I2 flows through the second transistor 22 and the supply voltage VCC at the first terminal 221 and the intermediate voltage VDDMID at the second terminal 222 are mainly constant.

If the current I2 increases the first steering voltage STEERMID also has to increase in order to keep the intermediate voltage VDDMID constant. If the current I2 decreases the first steering voltage STEERMID has to decrease in order to keep the intermediate voltage VDDMID constant. The first steering voltage STEERMID depends from the current I2 in the following way: STEERMID=VDDMID+sqrt(I2×L/K/W)+VTH, if VCC>STEERMID−VTH. "sqrt" is the square root function. K is a transistor constant. L and W are the transistor length and the transistor width, respectively.

When the supply voltage VCC decreases or increases the first steering voltage STEERMID has to increase or decrease, respectively, so that the current I2 is constant. Due to the early effect the current I2 depend from the supply voltage VCC and the intermediate voltage VDDMID in the following way:

I2=f(STEERMID−VDDMID)×(1+(VCC−VDDMID)/VEARLY), wherein f is a function describing the influence of the first steering voltage STEERMID and the intermediate voltage VDDMID. VEARLY is a so called early voltage that is roughly proportional to the transistor length L. The early effect increases with smaller channel length.

The load rejection of the transistor depends on the ratio W/L between the transistor width W and the transistor length L. The larger the transistor is the better is the load rejection.

The power supply rejection is limited by the early effect, as described above, and by a transistor coupling capacitance from the first terminal to the steering terminal. Relative variations of the supply voltage VCC are coupled fractionally to the first steering voltage STEERMID and consequently also to the intermediate voltage VDDMID that is proportional to the voltage STEERMID−VTH. This coupling effect is proportional to the ratio between the first capacitor 13 and a transistor capacitance between the steering terminal and the second terminal. Thus, a large first capacitor 13 reduces this coupling effect.

Typically, the supply voltage VDDRF of the contactless interface varies more than the supply voltage VCC of the contact based interface. Consequently, the power supply rejection may be more relevant for the dimensioning of the first transistor 21.

In one embodiment three operation modes to operate the chip with the voltage regulating circuit arrangement are possible. In the first operation mode the chip is operated only with the contact-based interface. In the second operation mode the chip is operated only with the contactless interface and in the third operation mode the supply voltage can be provided by both interfaces.

In the following the first operation is described. The supply voltage VCC is provided at the second node 32. The first regulator 10 provides the first steering voltage STEERMID by means of the charge pump 101. In one embodiment the charge pump 101 is necessary in order to provide the first steering voltage STEERMID that is larger than the supply voltage VCC. The switch 16 connects the steering terminal 233 of the second transistor 22 to the regulator 10 in order to apply the first steering voltage STEERMID to the steering terminal. The second transistor 22 provides the substantially conductive current path between its first and its second terminal 221, 222. In dependence of the first steering voltage STEERMID the supply voltage VCC is shifted to the intermediate voltage VDDMID that is provided at the third node 33.

In one embodiment the steering terminal 213 of the first transistor 21 is pulled to ground that the first transistor 21 is substantially not conductive.

One embodiment of the first regulator 10 comprises a regulation loop that is very slow when a fast load change or a fast supply power VCC change occurs. Thus, the intermediate voltage VDDMID will typically go down and up until reaching a stable state and then the regulation loop will compensate for it.

The second transistor 22 is substantially used as level shifter. The range of the intermediate voltage VDDMID is about two to three times smaller than the range of the supply voltage VCC. An advantage of an embodiment is that an exact adjustment of the value of the intermediate voltage VDDMID is not necessary.

The third transistor 23 acts as a regulator to severely adjust the fixed core voltage VDD for the system circuit 12. The core voltage VDD is controlled by means of the second regulator 11 providing the second steering voltage STEER the core voltage VDD is regulated by. In one embodiment the first and the second steering voltages STEERMID, STEER are controlled in dependence of the current consumption I of the system circuit. In an other embodiment the first and the second steering voltages STEERMID, STEER are controlled in dependence of the core voltage VDD. One embodiment controls the first steering voltage STEERMID in dependence of the intermediate voltage VDDMID.

In the second operation mode the chip is only operated with the contactless interface. A coil current is provided at the coil contact node LA/LB which depends on the electromagnetic field. The voltage at the coil contact node LA/LB varies in dependence on the strength and the modulation of the electromagnetic field. The first and the second diode 7, 8 restrict the direction of the coil current. A part of the coil current consumed by the system circuit 12 flows through the second diode 8. Another part of the coil current which is not used for operating the system circuit 12 flows via a shunt 9 that protects the chip from overvoltage.

The supply voltage VDDRF is provided at the first node 31. The switch 16 connects the steering terminal 213 of the first transistor 21 to the first regulator 10 in order to apply the first steering voltage STEERMID to the steering terminal 213 of the first transistor 21. In one embodiment of the invention the steering terminal 223 of the second transistor 22 is grounded.

The first regulator 10 shifts the supply voltage VDDRF to the intermediate voltage VDDMID by means of the first transistor 21. Controlling the second transistor 21 and the third transistor 21 in order to adjust the core voltage VDD to a predetermined value is equivalent with controlling the second transistor 22 and the third transistor 23 in the first operation mode. The first transistor 21 serves as level shifter while exact adjustment is performed by the third transistor 23.

When the contact-based interface and/or the contactless interface are switched the switch 16 should select fast the node 31, 32 in order to keep the core voltage VDD constant. The first capacitor 13 is coupled to the one of the steering terminals 213, 223 that has been on the reference potential GND before switching. After switching, the first capacitor 13 looses a part of its charge to load the respective gate of the steering terminal 213, 223. Typically, the intermediate voltage VDDMID undershoots. The undershoot depends on the ratio between the size of the first capacitor 13 and the transistor gate capacitance. However, the core voltage VDD will stay constant during the switching. Due to the two stage design of the regulation circuit arrangement the third transistor 23 in the second stage compensates the switching undershoot of the intermediate voltage VDDMID. Furthermore, the first capacitor 13 as well as the third capacitor 15 reduces the transistor coupling effect in the first and the second stage.

In the third operation mode the power may be supplied via both interfaces. In this cases one of the first and the second transistor 21, 22 are selected. The switch 16 connects that transistor to the first regulator 10.

Comparing an inventive embodiment of a voltage regulating circuit arrangement having two stages with an embodiment of a conventional voltage regulating circuit having only a single stage without the third transistor there are several benefits of the two stage embodiment. An advantage of the two stage embodiment is the improved current rejection and the improved power supply rejection compared with a single stage embodiment which needs the same space of an integrated circuit.

The load rejection of the single stage embodiment depends merely on the ratio W/L of the transistor that is selected. The larger this transistor is the better is the load rejection. The early voltage is a limiting aspect of the power supply rejection of this transistor. Increasing the transistor length increases the power supply rejection. In order to avoid a quality loss due to load rejection the transistor width has to be increased also if the transistor length is increased.

If both embodiments regulate a same supply voltage VDDRF, VCC to the core voltage VDD the range of the intermediate voltage VDDMID is two to three times smaller than the range of the supply voltage. Thus, the power supply rejection due to the early voltage VEARLY of the second stage transistor is also reduced by a factor two to three compared to the single stage embodiment. The power supply rejection due to the coupling between the intermediate voltage VDDMID and the first steering voltage STEER is also attenuated by a factor two to three.

Another benefit of the two stage embodiment is that the voltages applied to the third transistor are smaller than the voltages applied to a single stage transistor in order to achieve the same regulation. Thus, a transistor type that differs from the transistor type used in the single stage embodiment can be used. That transistor type may provide better current rejection and better power supply rejection.

In conclusion, even through the two stages embodiment has one additional transistor and some additional control logic, like the charge pump and the regulation loop in comparison to the single stage embodiment, it is possible to achieve a better performance out of it for the same area than with the single stage embodiment.

Figure 3:
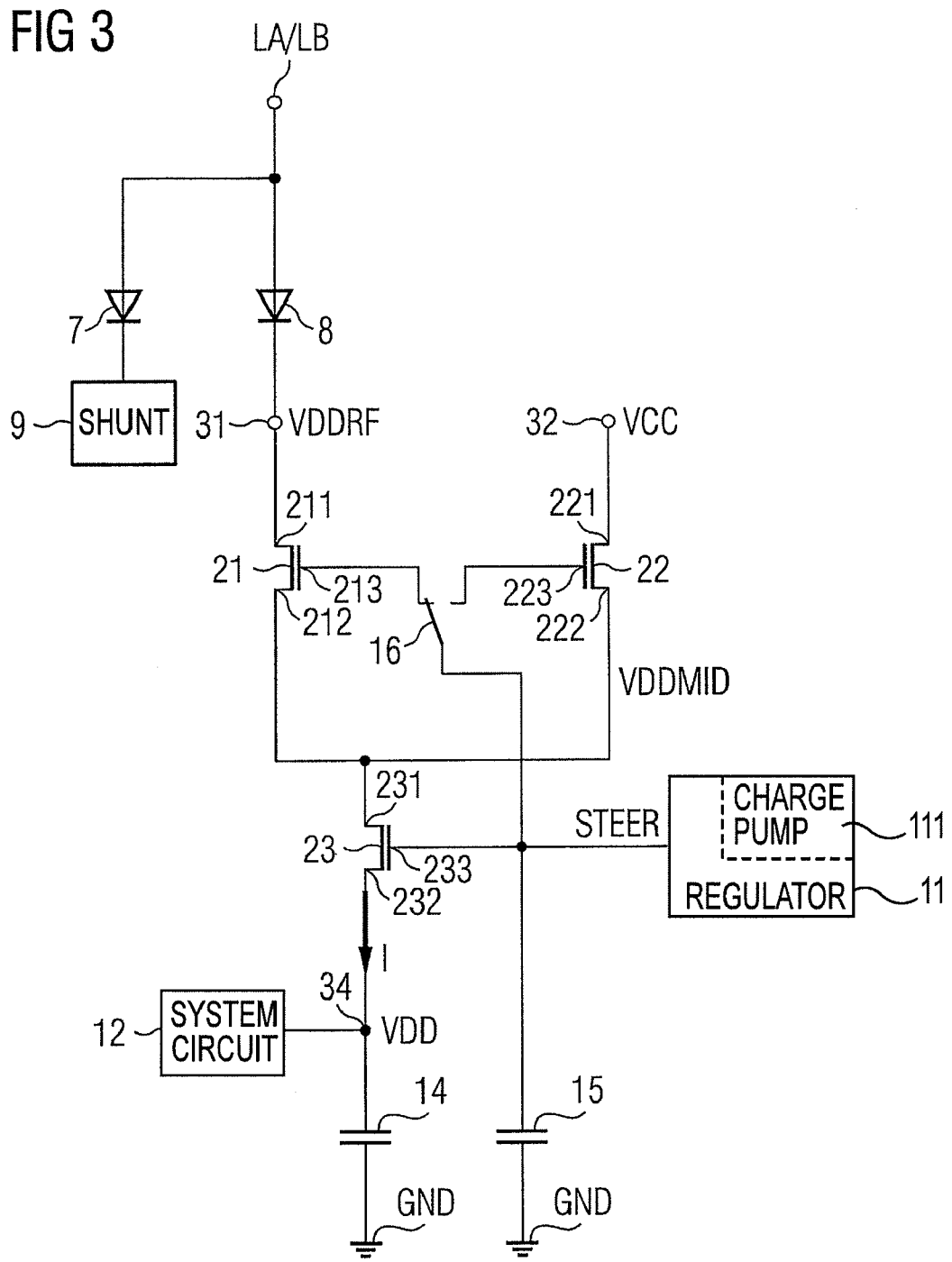
FIG. 3 is a block diagram illustrating one further embodiment of a circuit arrangement according to the present invention.

FIG. 3 shows a block diagram illustrating another embodiment of a circuit arrangement. Same reference numerals characterize the same features as in the embodiment shown FIG.

2. In order to avoid recurrences the description is concentrated to the features of the embodiment that differs from the previous embodiment.

The circuit arrangement comprises only one regulator 11 including a charge pump 111. The regulator 11 is coupled to the switch 16 as well as to the steering terminal 233 of the third transistor 23. Thus, the steering voltage STEER provided by the regulator 11 steers one of the first and the second transistor 21, 22 as well as the third transistor 23. The intermediate voltage VDDMID and the core voltage VDD are controlled by the same steering voltage STEER.

An advantage of the embodiment is the reduced hardware complexity, because only one regulator 11 having one charge pump 111 is necessary. But switching from one of the first and the second node 31, 32 to the other one increases the noise of the core voltage VDD in comparison with the previous embodiment.

A further advantage of an embodiment comprising only one regulator is that on the one hand the power supply rejection is decreased due to coupling from the supply voltage VCC to the steering voltage STEER. On the other hand the power supply rejection is increased because the range of the intermediate voltage VDDMID is typically smaller than in the previous embodiment.

Figure 4:
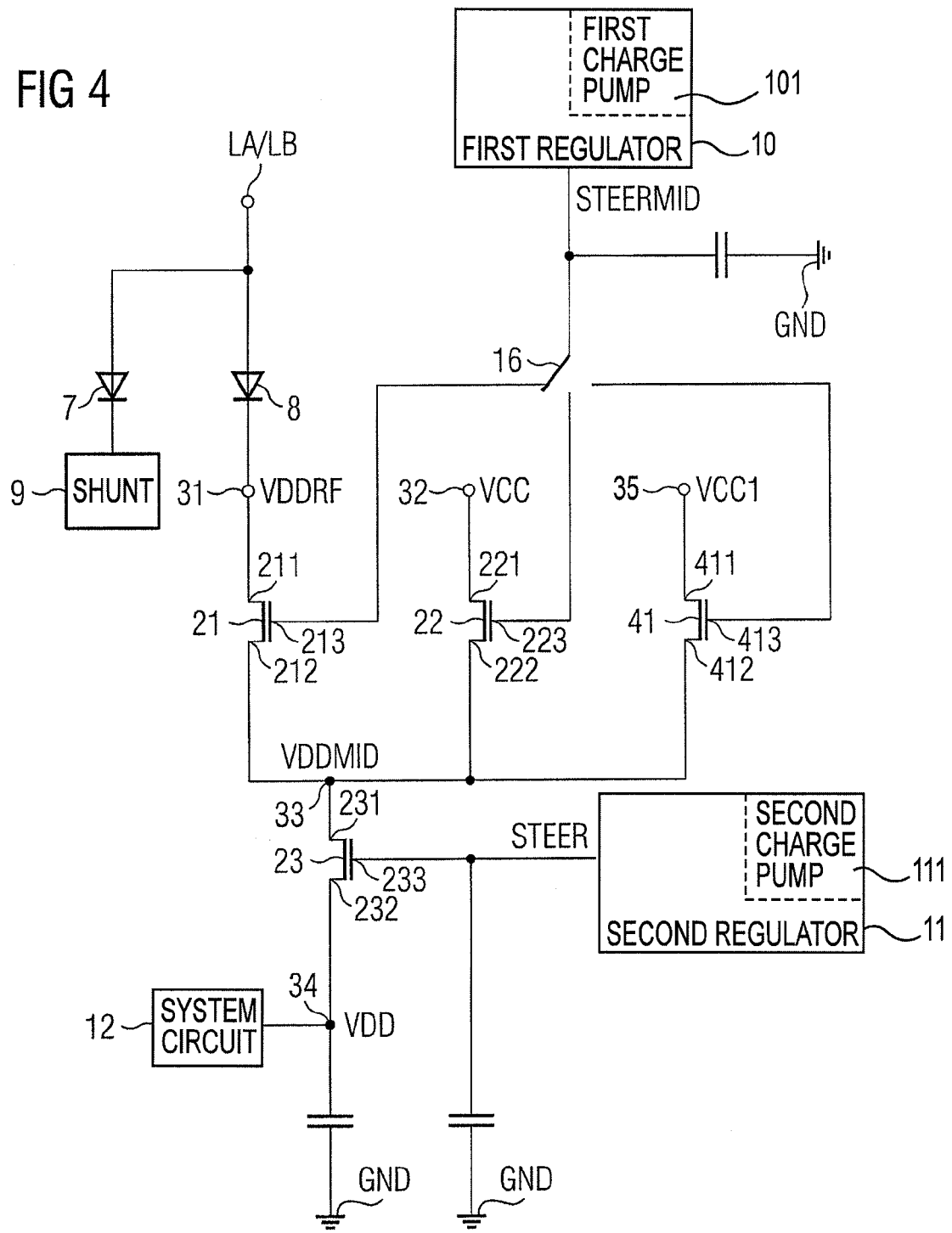
FIG. 4 is a block diagram illustrating one further embodiment of a circuit arrangement according to the present invention.

FIG. 4 shows a block diagram illustrating another embodiment of a circuit arrangement. Same reference numerals characterize the same features as in FIG. 2. In order to avoid recurrences the features of this embodiment that differs from the embodiment shown in FIG. 2 are merely described.

The circuit arrangement further comprises a fourth transistor 41 having a first terminal 411, a second terminal 412 and a steering terminal 413.

A fourth node 35 is coupled to the first terminal 411 of the fourth transistor 41. The second terminal 412 of the fourth transistor 41 is coupled to the third node 33. The fourth node 35 is configured to be connected to a further interface. One embodiment of the further interface can be a second contact-based interface. Another embodiment of the further interface can be a further contactless interface. However, the supply voltage VCC1 can be provided at the fourth node 35.

The switch 16 is configured to connect the first regulator 10 with the steering terminal 213, 223, 413 of one of the first transistor 21, the second transistor 22 and the fourth transistor 41 depending on which interface is used for power supply.

The embodiment is configured to regulate the supply voltage VDDRF, VCC, VCC1 provided at one of the first, the second and the fourth nodes 31, 32, 34 to the core voltage VDD.

One embodiment of the circuit arrangement comprises further nodes and further transistors, which are coupled in accordance with the fourth transistor 41. Thus, each further transistor is coupled between one of the further nodes and the third node 33. The switch is adapted in such a way that is can apply the first steering voltage STEERMID to one of the transistors.

It should be noted that the features of the embodiments can be combined, e.g. one embodiment including only one regulator for steering the transistors comprises more than two nodes for providing the supply voltage. Each node can provide the supply voltage of one of the interfaces.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

I claim:

1. A circuit arrangement for voltage regulation comprising:
a first transistor coupled between a first node and a third node;
a second transistor coupled between a second node and the third node;
a third transistor coupled between the third node and an output node; and
a control unit that can be coupled to the first transistor, that can be coupled to the second transistor, and is coupled to the third transistor,
wherein the control unit is configured to steer the transistors such that a predetermined output voltage is provided at the output node when a supply voltage is provided at one of the first node and the second node.

2. The circuit arrangement of claim 1, further comprising a switching unit adapted to couple the control unit to one of the first transistor and the second transistor.

3. The circuit arrangement of claim 2, wherein the control unit comprises a first regulator and a second regulator, the first regulator being coupled to the switching unit, the second regulator being coupled to the third transistor.

4. The circuit arrangement of claim 2, wherein the control unit comprises a regulator coupled to the switching unit and to the third transistor.

5. The circuit arrangement of claim 1, further comprising a capacitor having a first terminal that can be coupled to the first transistor or to the second transistor, and having a second terminal coupled to a reference potential.

6. The circuit arrangement of claim 1, further comprising:
a further node; and
a further transistor coupled between the further node and the third node,
wherein the control unit can be coupled to the further transistor and is configured to steer the transistors such that the predetermined output voltage is provided at the output node when the supply voltage is provided at one of the first node, the second node, and the further node.

7. The circuit arrangement of claim 1, wherein the first node is coupled to a contactless interface for supplying the supply voltage, and wherein the second node is coupled to a contact interface for supplying the supply voltage.

8. An integrated circuit for voltage regulation comprising:
a first transistor having a first terminal, a second terminal, and a steering terminal, wherein the first terminal is coupled to a first node and the second terminal is coupled to a third node;
a second transistor having a first terminal, a second terminal, and a steering terminal, wherein the first terminal is coupled to a second node and the second terminal is coupled to the third node;
a third transistor having a first terminal, a second terminal, and a steering terminal, wherein the first terminal is coupled to the third node and the second terminal is coupled to an output node; and
a control unit that can be coupled to the steering terminal of the first transistor, can be coupled to the steering terminal of the second transistor, and is coupled to the steering terminal of the third transistor,
wherein the control unit is configured to apply steering voltages to the transistors such that a predetermined output voltage is provided at the output node when a supply voltage is provided at one of the first node and the second node.

9. The integrated circuit of claim 8, further comprising a switching unit adapted to couple the control unit to one of the steering terminal of the first transistor and the steering terminal of the second transistor.

10. The integrated circuit of claim 9, wherein the control unit comprises a first regulator and a second regulator, the first regulator being coupled to the switching unit and configured to provide a first steering voltage, and the second regulator being coupled to the steering terminal of the third transistor and configured to provide a second steering voltage.

11. The integrated circuit of claim 9 wherein the control unit includes a regulator coupled to the switching unit and to the steering terminal of the third transistor, and the regulator is configured to provide a steering voltage.

12. The integrated circuit of claim 9, further comprising a capacitor including a first and a second terminal, wherein the first terminal is coupled between the control unit and the switching unit and the second terminal is coupled to a reference potential.

13. The integrated circuit of claim 9, further comprising:
a further node; and
a further transistor comprising a first terminal, a second terminal, and a steering terminal, wherein the first terminal is coupled to the further node and the second terminal is coupled to the third node,
wherein the control unit can be coupled to the further transistor and is configured to apply steering voltages to the transistors such that the predetermined output voltage is provided at the output node when the supply voltage is provided at one of the first node, the second node, and the further node.

14. The integrated circuit of claim 8, wherein the control unit comprises at least one charge pump.

15. The integrated circuit of claim 8, wherein one of the first, the second, and the third transistor is an NMOS transistor.

16. The integrated circuit of claim 8, wherein the first node is coupled to a contactless interface for supplying the supply voltage, and the second node is coupled to a contact interface for supplying the supply voltage.

17. A method for regulating a voltage, comprising:
supplying a supply voltage to one of a first node and a second node;
steering one of a first transistor and a second transistor such that an intermediate voltage is provided at a third node, wherein the first transistor is coupled between the first node and the third node, and the second transistor is coupled between the second node and the third node;
controlling an output voltage via steering a third transistor coupled between the third node and an output node; and
providing the output voltage at the output node.

18. The method of claim 17, further comprising controlling the intermediate voltage via steering the one of the first transistor and the second transistor.

19. The method of claim 17, wherein a first steering voltage is applied to one of the first transistor, and the second transistor and a second steering voltage is applied to the third transistor.

20. The method of claim 17, wherein a same steering voltage is applied to the one of the first transistor and the second transistor, and to the third transistor.

21. The method if claim 17, further comprising switching from steering the one of the first transistor and the second transistor to steering the other of the first transistor and the second transistor.

22. The method if claim 17, further comprising switching from steering the one of the first transistor and the second transistor to steering a further transistor that is coupled between a further node and the third node, wherein the supply voltage is applied to the further node.

23. The method of claim 17, further comprising applying the supply voltage via a contactless interface coupled to the first node.

24. The method of claim 17, further comprising applying the supply voltage via a contact interface coupled to the second node.

25. A method for regulating a voltage, comprising:
supplying a supply voltage to one of a first node and a second node;
applying a first steering voltage to one of a first transistor and a second transistor such that an intermediate voltage is provided at a third node, wherein the first transistor is coupled between the first node and the third node, and the second transistor is coupled between the second node and the third node;
providing an output voltage at an output node by applying a second steering voltage to a third transistor coupled between the third node and the output node; and
controlling the output voltage by controlling the second steering voltage such that the output voltage has a predetermined value.

26. The method of claim 25, further comprising adjusting the intermediate voltage by controlling the first steering voltage based on the intermediate voltage or based on the output voltage.

27. The method of claim 25, wherein the first steering voltage is equal to the second steering voltage.

28. The method of claim 27, wherein the first steering voltage and the second steering voltage are provided via a same charge pump.

29. The method if claim 25, further comprising switching from applying the first steering voltage to the one of the first transistor and the second transistor to applying the first steering voltage to the other of the first transistor and the second transistor.

30. The method of claim 25, further comprising applying the supply voltage via a contactless interface coupled to the first node or via a contact interface coupled to the second node.

31. The method of claim 25, wherein the first steering voltage is provided via a first charge pump and the second steering voltage is provided via second charge pump.

32. A circuit arrangement for regulating a voltage, comprising:
supply means for supplying a supply voltage to one of a first node and a second node;
steering means for steering one of a first transistor and a second transistor such that an intermediate voltage is provided at a third node, wherein the first transistor is coupled between the first node and the third node, and the second transistor is coupled between the second node and the third node;
control means for controlling an output voltage via steering a third transistor coupled between the third node and an output node; and
means for providing the output voltage at the output node.

33. A circuit arrangement for regulating a voltage, comprising:
a first transistor coupled between a first node and a third node;
a second transistor coupled between a second node and the third node;
a third transistor coupled between the third node and an output node; and
a control means for steering the transistors such that a predetermined output voltage is provided at the output node when a supply voltage is provided at one of the first node and the second node,
wherein the control means can be coupled to the first transistor, can be coupled to the second transistor, and is coupled to the third transistor.

* * * * *

UNITED STATES PATENT AND TRADEMARK OFFICE
CERTIFICATE OF CORRECTION

PATENT NO. : 7,675,282 B2  Page 1 of 1
APPLICATION NO. : 11/548088
DATED : March 9, 2010
INVENTOR(S) : Thomas Baglin It is certified that error appears in the above-identified patent and that said Letters Patent is hereby corrected as shown below:

In the Title Page

At column 1, in (56), the References Cited section, please delete "331/1 A" and insert -- 331/1A --, therefor.

In the claims

At column 9, line 5, in Claim 11, delete "9" and insert -- 9, --, therefor.
At column 9, line 53, in Claim 21, delete "if" and insert -- of --, therefor.
At column 9, line 57, in Claim 22, delete "if" and insert -- of --, therefor.
At column 10, line 24, in Claim 29, delete "if" and insert -- of --, therefor.

Signed and Sealed this

First Day of June, 2010

David J. Kappos
*Director of the United States Patent and Trademark Office*